United States Patent [19]

Shigeta et al.

[11] Patent Number: 4,626,480
[45] Date of Patent: Dec. 2, 1986

[54] MAGNETIC RECORDING MEDIUM COMPRISING A VACUUM-DEPOSITED MAGNETIC FILM OF A MAGNETIC MATERIAL AND A TUNGSTEN OXIDE AND METHOD FOR MAKING THE SAME

[75] Inventors: Masanobu Shigeta, Isehara; Makoto Mizukami, Yokohama; Toshikazu Nishihara, Zama, all of Japan

[73] Assignee: Victor Company of Japan, Limited, Japan

[21] Appl. No.: 696,581

[22] Filed: Jan. 30, 1985

[30] Foreign Application Priority Data

Feb. 2, 1984 [JP] Japan .................................. 59-16002

[51] Int. Cl.[4] .............................................. G11B 5/64
[52] U.S. Cl. .................................. 428/694; 428/702; 428/900
[58] Field of Search .............. 428/472, 694, 701, 702, 428/900; 427/128

[56] References Cited

U.S. PATENT DOCUMENTS

| | | | |
|---|---|---|---|
| 4,186,228 | 1/1980 | Ogawa et al. ........................ | 428/900 |
| 4,220,117 | 9/1980 | Shinohara ............................ | 428/694 |
| 4,323,621 | 4/1982 | Kober et al. ......................... | 428/900 |
| 4,343,834 | 8/1982 | Saito et al. .......................... | 427/132 |
| 4,367,257 | 1/1983 | Arsi et al. ........................... | 428/900 |
| 4,391,874 | 7/1983 | Yamamoto et al. ................. | 428/694 |
| 4,411,958 | 10/1983 | Sato et al. ............................ | 428/694 |
| 4,414,271 | 11/1983 | Kitamoto et al. ................... | 428/694 |
| 4,425,404 | 1/1984 | Suzuki et al. ........................ | 428/694 |
| 4,456,661 | 6/1984 | Yamamoto ........................... | 428/694 |
| 4,499,138 | 2/1985 | Yamamoto ........................... | 428/694 |
| 4,520,070 | 5/1985 | Yamamoto et al. ................. | 428/694 |

FOREIGN PATENT DOCUMENTS

| | | |
|---|---|---|
| 0053811 | 6/1982 | European Pat. Off. . |
| 2758772 | 7/1978 | Fed. Rep. of Germany . |
| 3216863 | 11/1982 | Fed. Rep. of Germany . |
| 3210351 | 9/1983 | Fed. Rep. of Germany . |

Primary Examiner—George F. Lesmes
Assistant Examiner—William M. Atkinson
Attorney, Agent, or Firm—Lowe, Price, LeBlanc, Becker & Shur

[57] ABSTRACT

Magnetic recording media for high density recording having a much improved coercive force comprise a non-magnetic substrate and a magnetic thin film formed on at least one side of the non-magnetic substrate. The magnetic thin film consists essentially of a magnetic material and a tungsten oxide used in an amount of up to about 50 wt %, calculated as W, of the magnetic thin film. A method for making the media is also described.

6 Claims, 3 Drawing Figures

MAGNETIC RECORDING MEDIUM COMPRISING A VACUUM-DEPOSITED MAGNETIC FILM OF A MAGNETIC MATERIAL AND A TUNGSTEN OXIDE AND METHOD FOR MAKING THE SAME

BACKGROUND OF THE INVENTION

1. Field of the Invention

This invention relates to the art of magnetic recording and more particularly, to magnetic recording media having a specific type of a magnetic thin film on which an information signal is to be recorded. The invention also relates to a method for making such media as mentioned above.

2. Description of the Prior Art

For the high density recording, there are used magnetic recording media comprising a magnetic metal thin film on a non-magnetic substrate. This type of magnetic recording medium should have good magnetic characteristics and particularly a high coercive force. The magnetic metal thin film is usually formed on a non-magnetic substrate by vacuum deposition, in which the stream of a magnetic metal vapor is applied to the substrate at an inclined or oblique angle with respect to the substrate so that a high coercive force is imparted to the resulting magnetic thin film.

In order to obtain, by the oblique deposition technique, a magnetic thin film whose coercive force is as high as possible, the angle of the inclination has to be made as large as possible. However, such a large oblique angle results in an appreciable lowering of film-forming efficiency and thus poor productivity.

Attempts were made to obtain magnetic thin films having a high coercive force by the use of a relatively small incident angle. For instance, there were proposed a method in which such a film was obtained as multi-layered, and a method in which oxygen was introduced during the course of vacuum deposition.

However, the former method is disadvantageous in view of economy because formation of multiple layers undesirably requires a number of complicated steps and a complicated apparatus. On the other hand, the latter method has problems in that the improvement in coercive force by the introduction of oxygen is to an extent of, at most, about 40%; however if the incident angle is small, the coercive force is not improved that much and when the amount of oxygen being introduced is too great, the coercive force is lowered.

SUMMARY OF THE INVENTION

It is therefore an object of the invention to provide magnetic recording media suitable for high density recording which has much improved magnetic characteristics and particularly a high coercive force.

It is another object of the invention to provide magnetic recording media having a magnetic thin film which comprises a magnetic material and a tungsten oxide.

It is a further object of the invention to provide a method for making magnetic recording media for high density recording in which a magnetic thin film is deposited on a non-magnetic substrate by existing vacuum deposition apparatus without any substantial changes in design.

It is a still further object of the invention to provide a method for making magnetic recording media by which a coercive force can be much improved.

It is another object of the invention to provide a method for making magnetic recording media in which vacuum deposition of a magnetic material may be carried out at a relatively low angle of incidence or even at an incident angle of zero.

The magnetic recording medium for high density recording according to the invention is characterized by a magnetic thin film formed on at least one side of a non-magnetic substrate. The magnetic thin film is made of a magnetic material and a tungsten oxide, $WO_x$ where $0 < x \leq 3$, used in an amount of up to about 50 wt %, calculated as W, of the magnetic thin film.

The magnetic film is formed by vacuum deposition on the substrate by a method which comprises heating, in vacuum, a magnetic material and a tungsten oxide at temperatures of not lower than 1600° C., preferably from 1700° to 2200° C. and from 800° to 1500° C., respectively, to permit the magnetic material and the tungsten oxide to be evaporated at speeds of from 50 to 1000 angstrom/second and 10 to 150 angstrom/second so that a 200 to 2000 angstrom thick film is deposited on the non-magnetic substrate. Preferably, the evaporation is effected at a continuously varying angle of incidence of from 90° to 45° as will be described in detail hereinafter.

DETAILED DESCRIPTION AND PREFERRED EMBODIMENTS OF THE INVENTION

Figure 1:
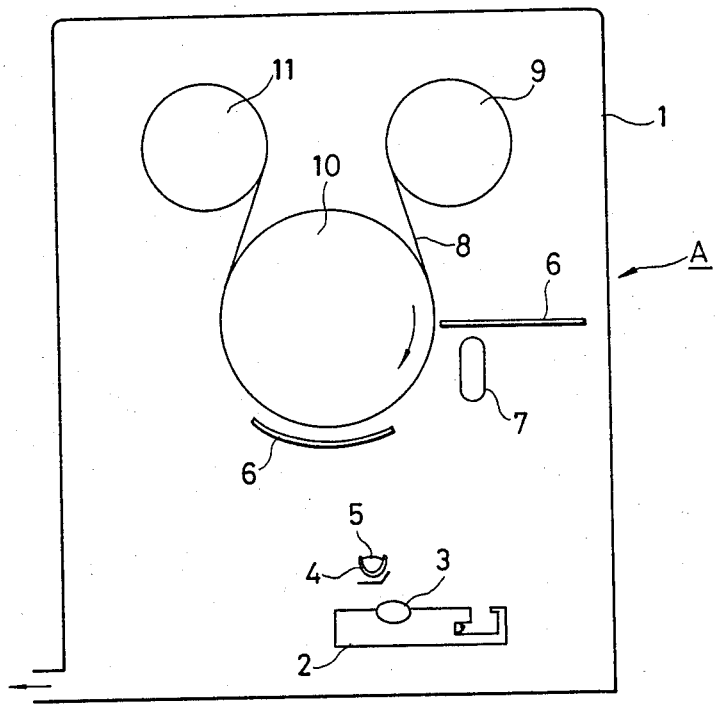
FIG. 1 is a schematic illustrative view of an apparatus for making a magnetic recording medium according to the invention.

The term "magnetic recording medium or media" used herein is intended to mean all magnetic recording media including magnetic tapes, magnetic discs, magnetic cards and the allied products.

As described above, the magnetic recording media of the invention is characterized by the use of a mixture of a magnetic material and a tungsten oxide as the magnetic thin film of the media. Several tungsten oxides which are relatively stable are known and all the oxides may be used in the practice of the invention. These compounds may be represented by the formula, $WO_x$ in which x is a value which satisfies the following inequality, $0 < x \leq 3$. In general, $WO_3$ is used as a starting tungsten oxide because of its ready availability and good stability. In addition, $WO_2$ and/or $W_2O_5$ may be used, if desired. Even when $WO_3$ is used as the starting tungsten oxide, the resulting magnetic film may include not only $WO_3$, but also $WO_2$ and other tungsten oxides due to the partial reduction of $WO_3$ though small in amounts.

The tungsten oxide should be used, when calculated as W, in an amount of up to about 50 wt %, preferably from 3 to 30 wt %, of the magnetic thin film or the total composition in the film. Most preferably, the amount of the tungsten oxide is 10 to 15 wt % calculated as W. When the calculated content is 12.8 wt %, the coercive force increases to an extent of about 2.2 times the coercive force of a tungsten oxide-free magnetic recording medium. This is much better than the case attained by the oxygen-introducing method.

Even if tungsten oxides, which are not magnetic in nature, are contained in amounts defined above in a magnetic film or layer, the squareness does not lower to an appreciable extent, i.e. the degree of the lowering is substantially equivalent to the degree produced by the known oxygen-introducing method.

The magnetic materials to be vacuum-deposited along with a tungsten oxide may be any known metals or metal alloys ordinarily used for these purposes. Preferable examples of the magnetic materials include metals such as Fe, Co, Ni and the like, and alloys of these metals. Most preferably, Co-Ni alloys are used. In addition, ferromagnetic iron oxides such as gamma-$Fe_2O_3$ and $Fe_3O_4$ may also be used.

Substrates should be non-magnetic in nature and include, for example, films, foils, and sheets of various materials. Examples of such materials include synthetic resins such as polyesters, polyolefins, and the like, metals such as aluminium, copper and the like, and glasses or ceramics.

Fabrication of the magnetic recording media according to the invention is described with reference to the accompanying drawings and particularly, FIG. 1. In the figure, there is shown an apparatus for making a magnetic recording medium for high density recording. The apparatus is generally indicated by A. The apparatus A includes a vacuum chamber 1, in which there is provided a container 2 having, in position, a magnetic material 3 such as, for example, Co-Ni with a Co to Ni ratio by weight of 80:20. Above the container 2 is provided another container 4 for accomodating a tungsten oxide 5 such as $WO_3$. The magnetic material 3 in the container 2 is vacuum-evaporated by means of, for example, an electron beam heater built therein. The tungsten oxide 5 in the container 4 is evaporated by a heating resistor (not shown). Indicated by 6 are shielding plates, by 7 is an evaporation monitor, and by 8 is a non-magnetic substrate in the form of a sheet, which is moved in the direction of an arrow from a feed roller 9 through a cooling drum 10 to a take-up roller 11.

In operation, the vacuum chamber 1 is kept at $5 \times 10^{-5}$ torr or below, in which the magnetic material 3 is heated to a temperature of, for example, from 1800° to 2000° C. for magnetic Co-Ni alloy. This heating temperature may vary depending on the type of magnetic material and is generally not lower than 1600° C., preferably from 1700° to 2200° C. The magnetic material 3 is vacuum-evaporated at a rate of from 50 to 1000 angstrom/second. At the same time, the tungsten oxide 5 is heated to a temperature of from 800° to 1500° C. and evaporated at a rate of from 10 to 150 angstrom/second. The apparatus, as shown in FIG. 1, is so designed that the streams of vapors evaporated from the magnetic material 3 and the tungsten oxide 5 are deposited on the non-magnetic substrate at a continuously varying angle of incidence, which starts from 90° and completes at 45°. Although an incident angle of zero may be used, it is preferred that the incident angle is continuously varied, as mentioned above, from 90° to 45° in view of the efficiency of improving the coercive force. During the evaporation, the magnetic material 3 and the tungsten oxide 5 are mixed together to give a magnetic film of the mixture. In general, the magnetic film is deposited in a thickness of from 200 to 2000 angstrom. Needless to say, the term "incident angle" or "angle of incidence" used herein means an angle of a vapor stream with respect to the normal line of a substrate on which the vapor is deposited.

The mixing ratio of the magnetic material and the tungsten oxide may be arbitrarily varied by controlling the heating temperature of the tungsten oxide, i.e. the evaporation rate of tungsten oxide can be varied depending on the heating temperature and thus the mixing ratio with the magnetic material can be readily controlled as desired.

According to the method of the invention, a starting tungsten oxide used is usually $WO_3$ because this oxide is very stable and readily available. It has been experimentally confirmed that when $WO_3$ is vacuum-evaporated, $WO_2$ and/or $W_2O_5$ is also formed along with a major proportion of $WO_3$. This is considered due to the fact that the starting $WO_3$ is partially reduced during the vacuum evaporation. Tungsten oxides other than $WO_3$ are also effective in improving the coercive force of the resulting magnetic media.

The present invention is particularly described by way of example.

EXAMPLE

Magnetic recording media were made using an apparatus of the type shown in FIG. 1 while changing the content of $WO_3$ in a magnetic film. Magnetic Co-Ni alloy and $WO_3$ were placed in the vacuum chamber 1 maintained at a vacuum of $5 \times 10^{-5}$ torr. The alloy was heated to about 1800° to 2000° C. and evaporated at a rate of 50 to 1000 angstrom/second. On the other hand, the tungsten oxide was also heated to 800° to 1500° C. and evaporated at a rate of from 10 to 150 angstrom/second. Both materials were thus deposited on a polyester film substrate at an angle of incidence continuously changing from 90° to 45° and cooled on the roller 10. The resulting magnetic film had a thickness of about 1500 angstrom.

The magnetic recording media were subjected to measurements of a coercive force, Hc, and a squareness, Rs. The results of the measurements are shown in FIGS. 2 and 3 in which the Hc and Rs characteristics are depicted in relation to the calculated content of W, not $WO_3$.

Figure 2:
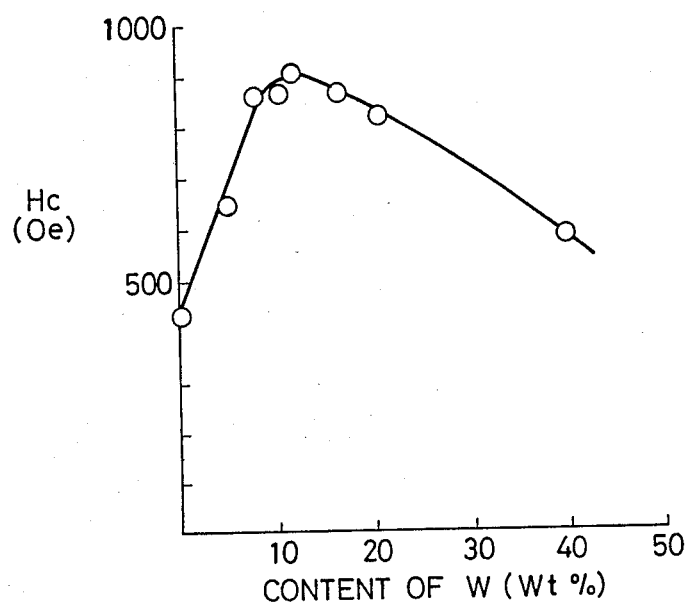
FIG. 2 is a graphical representation of a coercive force in relation to the content of tungsten oxide as W.
Figure 3:
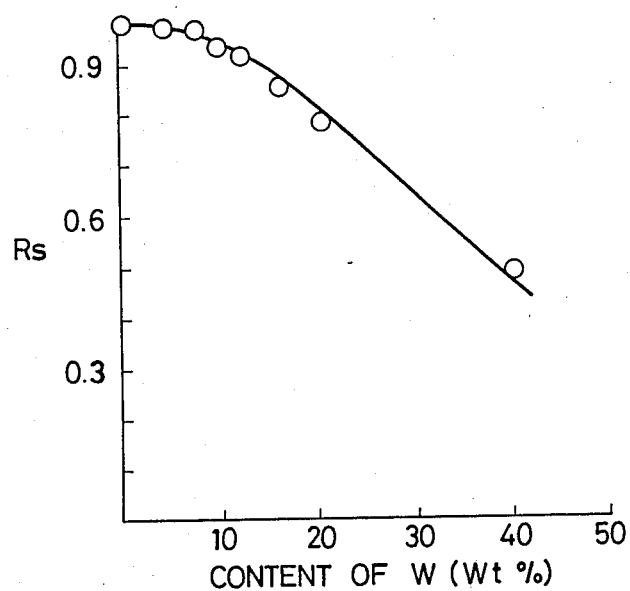
FIG. 3 is a graphical representation of a squareness in relation to the content of tungsten oxide as W.

From FIG. 2, it will be seen that the coercive force is improved when the $WO_3$ is vacuum-deposited along with the magnetic alloy. The ratio by weight of $WO_3$, calculated as W, is up to 50 wt %, preferably from 3 to 30 wt % and most preferably 10 to 15 wt %. Within the above range of the ratio, the squareness of the media is acceptable as will be seen from FIG. 3.

In the above example, the oblique deposition is described, but the improvement of the magnetic recording media with respect to the coercive force was also recognized when the magnetic film was formed by horizontal or non-oblique deposition in which an angle of incidence was zero. More particularly, when Co-Ni was deposited by the non-oblique deposition without use of $WO_3$ in a thickness of 1500 angstrom, the coercive force was found to be as low as about 50 to 150 oersted. On the other hand, when $WO_3$ was used in combination with Co-Ni, the Hc value increased to about 300 to 400 oersted.

As a matter of course, the magnetic thin film may be formed on one or opposite sides of a substrate depending on the purposes of the magnetic recording media.

What is claimed is:

1. A magnetic recording medium for high density recording comprising a non-magnetic substrate and a magnetic thin film formed on at least one side of the non-magnetic substrate by vacuum deposition, said magnetic thin film consisting essentially of a magnetic material and a tungsten oxide used in an amount of from 10 to about 50 wt %, calculated as W, of the magnetic thin film.

2. The magnetic recording medium according to claim 1, wherein the magnetic material is an Co-Ni alloy and the tungsten oxide is $WO_3$.

3. The magnetic recording medium according to claim 1, wherein the tungsten oxide is used in an amount of from 10 to 30 wt % of the magnetic thin film when calculated as W.

4. The magnetic recording medium according to claim 1, wherein the tungsten oxide is represented by the formula, $WO_x$ in which $0 < x \leq 3$.

5. The magnetic recording medium according to claim 4, wherein the tungsten oxide is $WO_3$.

6. A magnetic recording medium for high density recording comprising a non-magnetic substrate and a magnetic thin film formed on at least one side of the non-magnetic substrate by vacuum deposition, said magnetic thin film consisting essentially of a magnetic material and a tungsten oxide used in an amount of from 10 to 15 wt %, calculated as W, of the magnetic thin film.

* * * * *